Feb. 2, 1971     R. SCHRADER ET AL     3,560,545
PROCESS FOR PREPARING METHYL-OR PHENYLCHLOROSILANES
Filed May 31, 1968     2 Sheets-Sheet 1

INVENTORS
RICHARD SCHRADER et al

BY
AGENT

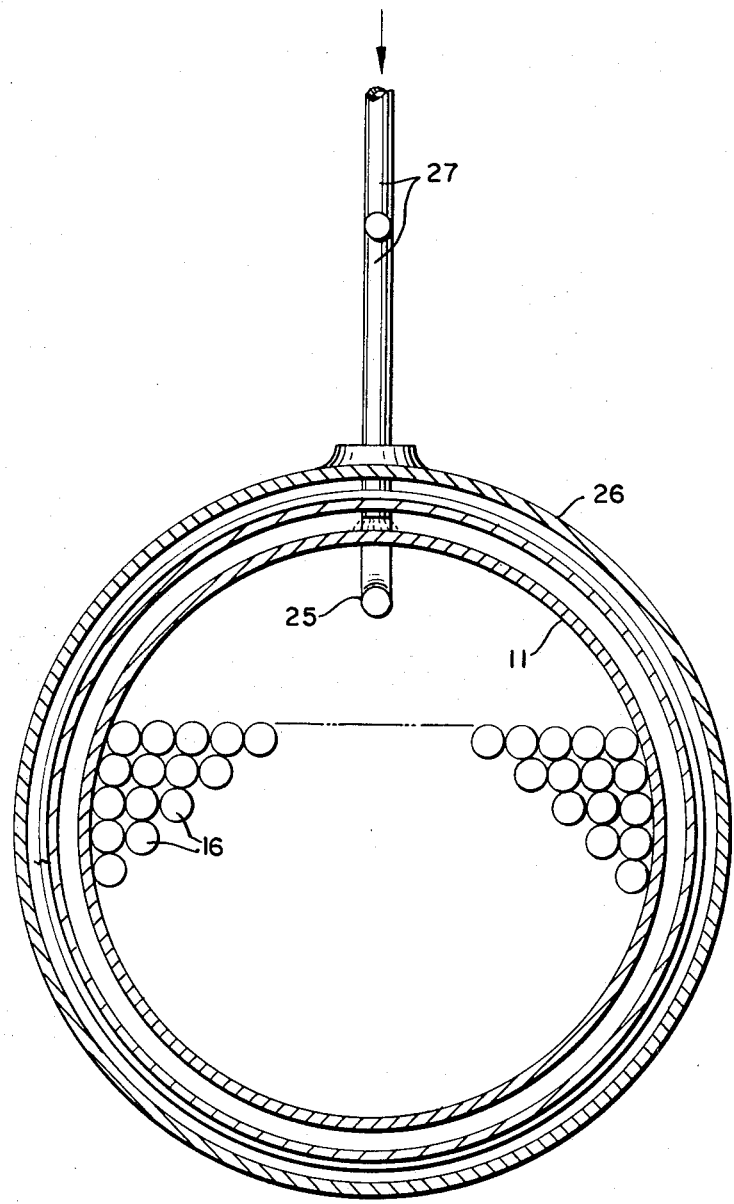

United States Patent Office 3,560,545
Patented Feb. 2, 1971

3,560,545
PROCESS FOR PREPARING METHYL OR PHENYLCHLOROSILANES
Richard Schrader and Hubert Hennek, Freiberg, Karl Dreier and Roland Bugge, Nunchritz, Joh. Frohnert, Freiberg, and Wolfg. Eichler, Nunchritz, Germany, assignors to VEB Chemiewerk Nunchritz, Nunchritz, Germany
Filed May 31, 1968, Ser. No. 733,352
Int. Cl. C07f 7/16
U.S. Cl. 260—448.2    7 Claims

ABSTRACT OF THE DISCLOSURE

Process for preparing organochlorosilanes, namely methyl- or phenylchlorosilanes wherein silicon-containing starting materials are reacted in the presence of a copper catalyst with methyl- or phenylchloride while being shaken in a vibrating zone during the reaction. In one embodiment, the catalyst is produced during the reaction from parts of the grinding mechanism. The process is carried out preferably in a vibrating mill.

---

Figure 1:
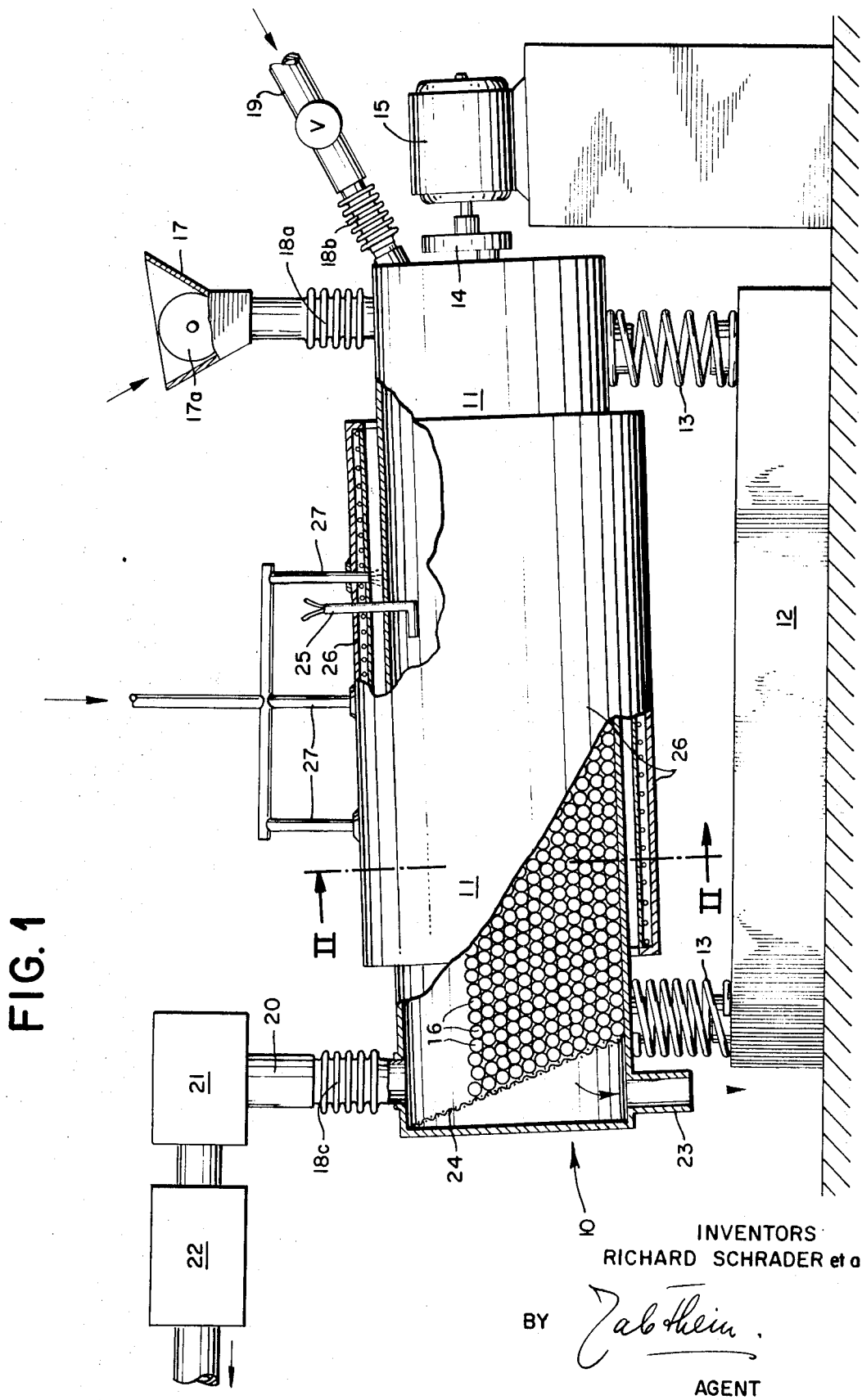

The invention relates to a process for preparing methyl- or phenylchlorosilanes from the starting materials in a single-stage process.

Processes are already known to prepare organochlorosilanes wherein the starting materials are prepared in a special unit as a mixture of silicon and copper powder, or as a copper-silicon alloy mixed with alkyl- or aryl chlorides at elevated temperatures by "direct synthesis." For the reaction, fluidization reactors or devices similar to rotary kilns are used in multistate processes.

It is a disadvantage of these processes that the starting materials have to be comminuted in grinding devices and have to undergo transportation to other devices for chemical reaction. Copper powder to be used as catalyst has to be finely ground. Since such a fine copper powder is immediately converted into the oxide, grinding has to be performed in the presence of grease or under a protecting gas atmosphere. For mixing the silicon and the copper powder, special equipment will again be required.

It is an object of the invention to provide a process which permits to avoid the drawbacks of the known art processes and to prepare methyl- or phenylchlorosilanes in a simple manner on an industrial scale with simultaneous increase in yield.

It is a further object of the invention to provide a process which makes it possible to obtain final products having the desired properties at low cost and energy input.

It is yet another object to provide a single-stage instead of the multi-stage process for preparing methyl- or phenylchlorosilanes in particularly adapted apparatus.

According to the invention, the above objects are realized by first comminuting the starting materials, in the form of ferrosilicon, or a copper-silicon alloy, and a copper catalyst, and then feeding them to a vibrating mill. In the mill, the materials are pretreated for the chemical reaction. If copper balls are used in the mill, the powder rubbed off from the balls may serve as catalyst in the reaction.

The methyl- or phenylchlorides necessary for the reaction are likewise introduced into the mill. The chemical reaction is exathermal. Therefore, cooling means are provided for the grinding and reaction vessels in order to prevent overheating.

Unreacted chlorides and the methyl- or phenylchlorosilanes obtained in the reaction are withdrawn. The methyl- or phenylchlorosilanes undergo condensation, and the remaining gaseous methyl- or phenylchlorides are returned into the mill. Any dust consisting of starting materials, which are entrained from the reaction chamber by the gas, are deposited in separators before the condensation is effected and returned to the mill for further reaction; suitable separators may be displacement or dielectric members or electro-filters.

Starting materials which have not undergone reaction are discharged from the mill and recycled into the mill with or without addition of fresh starting materials.

The various objects, features and attendant advantages of the present invention will become more apparent from the following description of the process and of a preferred, exemplary embodiment of an apparatus when considered in conjunction with the accompanying drawings, wherein FIG. 1 is a somewhat schematic, partly sectional side view of an apparatus or arrangement for carrying out the inventive process; and FIG. 2 is a sectional view along line II—II of FIG. 1.

Referring to the drawings, a vibrating mill is generally designated by numeral 10. The mill comprises a cylinder 11, a base 12 for mounting the cylinder thereon, and interposed therebetween springs 13 or the like structures which permit the cylinder to oscillate freely when it is driven. The drive means comprise an eccentric 14 and a motor 15. Within the cylinder 11, grinding balls 16 or the like are provided.

Near one end of the cylinder 11, a feeding funnel 17 with a dosing device 17a is detachably connected to the cylinder 11 at 18a; the funnel 17 serves for the admission of the solid starting materials. The dosing device 17a is fitted in a gas-tight manner into the funnel 17.

Near the funnel, a conduit 19 opens into cylinder 11, through which methyl- or phenylchloride is blown into the same. This conduit, too, is detachably mounted to the cylinder 11 as schematically shown at 18b.

At the other end of the cylinder 11, discharge means are provided for the withdrawal of the gaseous reaction products, said means consisting of a tube 20, loosely connected to cylinder 11 at 18c. The tube 20 leads directly into a gas purification chamber 21, and from there the gas is passed to a condenser 22. At the bottom of cylinder 11, a tube 23 serves for the discharge of unreacted starting materials which are recycled (by means not shown).

Within the cylinder 11, near the discharge end, a screen 24 is arranged which prevents the balls 16 from dropping into the discharge tube 23 while allowing unreacted materials to pass through. If desired, the discharge pipe 23 can be connected to another grinding cylinder in case a double vibrating mill is to be used (not shown).

In the free space above the balls 16 in the cylinder 11, a thermocouple 25 is arranged for temperature control inside the cylinder whereas from the outside, heat control can be effected by a heating jacket 26 or similar expedient which is so positioned around the cylinder 11 by spacers that it remains stationary and will not participate in the vibration. The heating jacket is mainly in use at the start of the reaction. Cooling means 27 are further provided, e.g., in the form of sprayers for temperature control during the reaction. These sprayers 27 are preferably narrow tubes which extend through bores provided in jacket 26 to make it possible for the coolant to impinge directly on cylinder 11.

The process according to the invention has the advantage that by combining two stages, transportation of the materials between the stages has become dispensable. Moreover, the preparation of copper powder in a separate operation and the prevention of its oxidation are likewise unnecessary.

Due to the recycling of the starting materials, the silicon contents therein decreases progressively, a fact which renders the process very economical. It has proved particularly advantageous that in this process impure silicon-ferrosilicon mixtures and impure copper-silicon alloys can be used as starting materials.

The invention will now be illustrated by specific examples, but it should be understood that these are given by way of illustration and not of limitation, and that many changes in the details can be made without departing from the spirit of the invention.

EXAMPLE 1

A precomminuted copper-silicon alloy having 79% silicon and 11% copper was fed continuously by the funnel 17 with the dosing device 17a into the tubular vibrating mill 10 which was heated to about 300° C. for starting the reaction. In this case the copper of the copper-silicon alloy makes addition of a separate catalyst unnecessary. Gaseous methylchloride was separately blown in at 19. An hourly ratio of 75 parts by weight of copper-silicon alloy:183 parts by weight of methylchloride was maintained as closely as possible.

After the reaction had properly started, the cylinder 11 was cooled by the sprayers 27 and the temperature was adjusted to 260° C., measured in the free space above the balls 16, for example by way of the thermocouple 25.

The reactants remain in the vibrating mill for a period ranging from 20 to 30 minutes. This includes the time from admission of the reactants to the discharge of the reaction products. Unreacted starting materials are withdrawn and returned in the mill.

Obtained were 146 parts by weight methylchlorosilane which, among other components, consisted of 47% by weight of dimethyldichlorosilane and 26% by weight of methyltrichlorosilane, which were determined by the gas-chromatographic method and by boiling point during fractional distillation.

EXAMPLE 2

The vibrating mill as described with reference to the drawings, whose cylinder 11 is filled with copper balls 16, was heated to a temperature of 300° C. for the start of the reaction. By way of the funnel 17 with the dosing device 17a a precomminuted technical ferrosilicon was introduced, containing 94% by weight of silicon. Methylchloride was blown in separately. The copper powder necessary as catalyst in the reaction was automatically produced by the rubbing of the copper balls against each other.

During the continuous reaction the ratio of ferrosilicon fed into the reaction to that of methylchloride was 145 parts by weight:352 parts by weight. The temperature in the cylinder was again adjusted to 260° C.

Obtained were 273 parts by weight methylchlorosilane, containing as main ingredients 38% by weight of dimethyldichlorosilane and 34% by weight methyltrichlorosilane, which were determined as indicated above.

EXAMPLE 3

A cold vibrating mill was continuously charged with 600 parts by weight of a mixture of technical-grade ferrosilicon (94% silicon contents) and with copper powder, as well as 272 parts by weight of gaseous methylchloride and was maintained in operation for one hour. The temperature in the mill rose to 50° C. The reaction only started when the mill was heated about 300° C., charging being continued; at that time the continuous charging of methylchloride was decreased to 113 parts by weight while the continuous addition of ferrosilicon was increased to 1000 p.b.w.

The mixture of methylchlorosilanes obtained in this manner was continuously withdrawn and condensed; the main components were 70% by weight of dimethyldichlorosilane and 22% by weight of methyltrichlorosilane.

It should be understood that it is possible to arrive at a higher amount of methyltrichlorosilane by allowing the components to react under modified conditions.

EXAMPLE 4

A heatable, tubular vibrating mill was heated up to 400° C., and after this temperature had been reached, was continuously charged, while vibrating, with 10 parts by weight of a mixture of technical-grade ferrosilicon (94% silicon contents) and copper powder, as well as 100 parts by weight of phenylchloride. During the test, the temperature of the mill was raised to 450° C.

The condensation products of the reaction were continuously withdrawn; they contained as main ingredients phenylchlorosilane, benzene, and unreacted phenylchloride.

The ratio between diphenyldichlorosilane $(C_6H_5)_2 \cdot SiCl_2$ and phenyltrichlorosilane $(C_6H_5) \cdot SiCl_3$ varied between 3:1 and 1:1.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What we claim is:

1. A process for preparing methylchlorosilanes or phenylchlorosilanes, which comprises introducing precomminuted starting material selected from the group consisting of ferrosilicon and a copper-silicon alloy into a confined zone undergoing vibrations, introducing methylchloride or phenylchloride into said zone, providing a copper catalyst for the reaction, allowing the starting material and methyl- or phenylchloride to remain in said zone until the reaction therebetween is completed, and thereafter withdrawing the methyl- or phenylchlorosilanes so obtained while separately discharging the unreacted starting material for recirculation.

2. The process as defined in claim 1, wherein the reaction is carried out in the presence of copper powder as a catalyst which is prepared in situ by the rubbing of copper balls against each other in the confined zone undergoing vibrations.

3. The process as defined in claim 1, wherein dust withdrawn with gaseous reaction products is separated therefrom and returned into the reaction process.

4. The process as defined in claim 1, wherein fresh starting material is added to the unreacted starting materials before it is returned into the process for further reaction.

5. The process as defined in claim 1, wherein a mixture of methylchlorosilanes is produced from the starting material by reaction with methyl chloride.

6. The process as defined in claim 5, wherein the mixture of methylchlorosilanes contains dimethyldichlorosilane amounting from 38 to over 70% by weight and methyltrichlorosilane amounting from 22 to 34% by weight.

7. The process as defined in claim 5, wherein the mixture of methylchlorosilanes contains methyltrichlorosilane as main ingredient.

References Cited

UNITED STATES PATENTS

| | | | |
|---|---|---|---|
| 2,380,997 | 8/1945 | Patnode | 260—448.2X |
| 2,380,998 | 8/1945 | Sprung et al. | 260—448.2X |
| 2,380,999 | 8/1945 | Sprung et al. | 260—448.2X |
| 2,488,487 | 11/1949 | Barry et al. | 260—448.2(T) |
| 2,579,341 | 12/1951 | Schwenker | 260—448.2(T) |
| 2,595,767 | 5/1952 | Coe et al. | 260—448.2(T) |
| 2,598,435 | 5/1952 | Mohler et al. | 260—448.2(T) |

OTHER REFERENCES

Stelling et al.: "Chemical Abstracts," 47, 1953, p. 6714.

TOBIAS E. LEVOW, Primary Examiner

P. F. SHAVER, Assistant Examiner

U.S. Cl. X.R.

260—448.2T